United States Patent
Hayes

[15] 3,646,373
[45] Feb. 29, 1972

[54] COMBINE SWEEP CONVEYOR

[72] Inventor: John Burch Hayes, Milan, Ill.
[73] Assignee: Deere & Company, Moline, Ill.
[22] Filed: June 11, 1970
[21] Appl. No.: 45,435

[52] U.S. Cl. ........................................................130/26
[51] Int. Cl. ...................................................A01f 12/30
[58] Field of Search ...........................130/24, 26, 27 HA

[56] References Cited

UNITED STATES PATENTS 1,257,802   2/1918   Butterworth.....................130/27 HA

FOREIGN PATENTS OR APPLICATIONS 858,900   1/1961   Great Britain......................130/24

Primary Examiner—Antonio F. Guida
Attorney—H. Vincent Harsha, Harold M. Knoth, William A. Murray, John M. Nolan and Raymond L. Hollister

[57] ABSTRACT

A combine having a threshing unit, a plurality of straw walkers mounted in crop-receiving relationship to the threshing unit for rotational translatory movement, a cleaning unit mounted beneath the straw walkers, a fixed grain pan mounted between the straw walkers and grain pan having a terminal end positioned over the material-receiving portion of the cleaning unit, and a plurality of resilient sweeps secured to and depending from each of the straw walkers along the length thereof for engaging material on the pan and moving the material to the terminal end of the pan during the lower portion of the path of travel of the straw walkers.

4 Claims, 2 Drawing Figures

INVENTOR.
JOHN B. HAYES

BY R L Hollister

ATTORNEY 3,646,373

COMBINE SWEEP CONVEYOR

BACKGROUND OF THE INVENTION

The present invention relates generally to combines and more particularly relates to a sweep conveyor under the straw walkers.

In a conventional combine, the grain or similar crop is harvested and fed to a threshing cylinder and concave which separates the majority of the grain from the straw. The remaining grain and straw are thrown rearwardly onto straw walkers, which are driven with a rotational translatory movement to move the straw out the rear of the combine while the grain and chaff drop through the straw walkers and are conveyed to a grain cleaning unit. The typical combine also employed some means to catch the grain and chaff dropping through the straw walkers and deliver the same to the forward portion or material-receiving portion of the grain cleaning unit. The means for gathering and conveying the grain and chaff to the forward portion of the cleaning unit has, in the past, taken many forms, including vibrating pans and augers.

SUMMARY OF THE INVENTION

The principal object of the present invention is to provide an improved low-cost and efficient conveying mechanism for gathering grain and chaff passing through the straw walkers of a combine and delivering the same to the material-receiving portion of a grain cleaning unit.

Another object of the present invention is to provide a conveying mechanism beneath the straw walkers of a combine which requires a minimal clearance between the straw walkers and a grain cleaning unit.

Still another object of the present invention is to provide a conveying mechanism beneath the straw walkers of a combine which derives all its movement from the straw walkers and which requires no additional drive.

A further object of the present invention is to provide a conveying mechanism beneath the straw walkers of a combine for gathering grain and chaff dropping through the straw walkers and delivering the same to the material-receiving portion of a grain cleaning unit, the conveying mechanism including a fixed pan having a terminal and overlying a forward portion of the cleaning unit and a plurality of sweeps carried by the straw walkers for engaging material on the pan and moving the same to the terminal end of the pan.

The above objects and additional objects and advantages of the present invention will become apparent along with the details of construction of a preferred embodiment of the invention upon a reading of the following detailed description when taken in conjunction with the accompanying drawing:

DESCRIPTION OF THE PREFERRED EMBODIMENT

Figure 1:
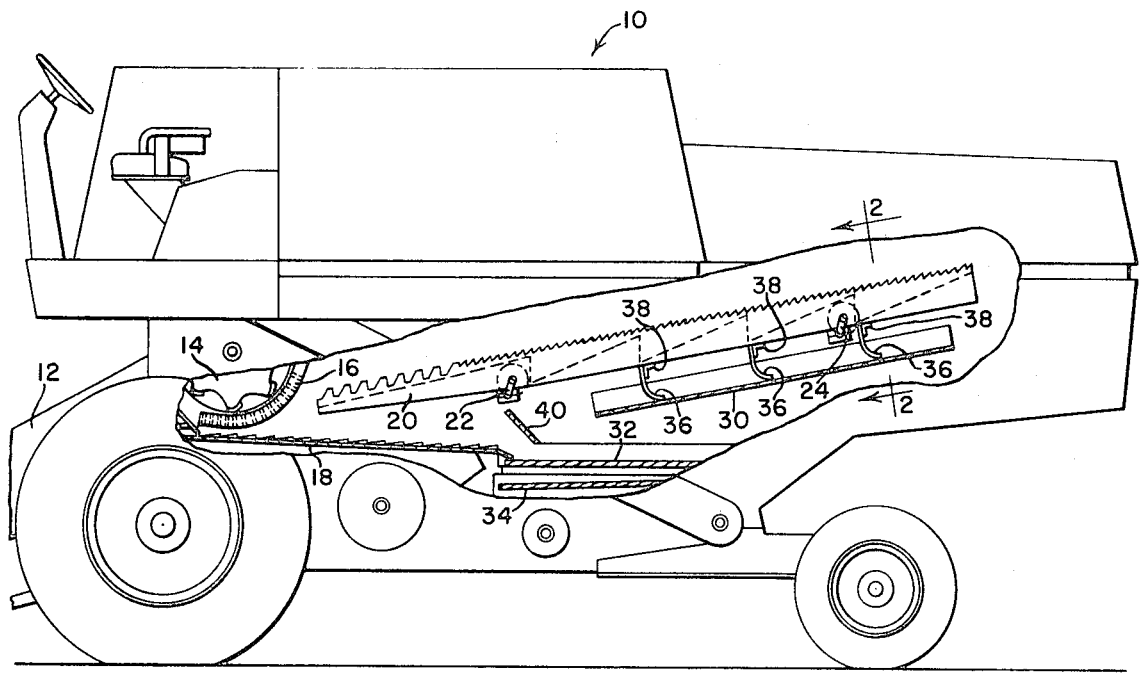
FIG. 1 is a side elevational view of a combine with a portion of the wall broken away to show some of the inner components of the combine.
Figure 2:
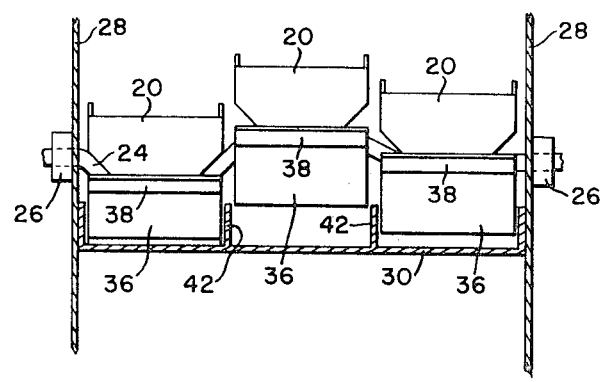
FIG. 2 is a sectional view taken substantially along the lines 2—2 of FIG. 1.

With reference to the drawing, a self-propelled harvesting implement or combine is designated generally by the reference numeral 10 and includes a conventional feeder housing 12 which delivers crop gathered by a conventional crop-gathering unit (undisclosed) to a threshing unit including a rotating cylinder 14 and an associated concave 16. As the crop passes between the cylinder 14 and concave 16, the majority of the grain is separated from the straw and drops through the concave onto a forward grain pan 18. The straw and remaining grain are thrown rearwardly by the threshing unit onto a separating unit which includes a plurality of straw walkers 20. The illustrated combine includes three straw walkers 20 which are mounted in side-by-side relation within the sidewalls of the combine. The straw walkers 20 are supported and driven by front and rear crankshafts 22 and 24 carried by journal blocks 26 secured to the sidewalls 28 of the combine. The crankpins of the crankshaft 24 are offset from each other equal angular distances to give each walker a different rotational pattern and prevent the straw from forming a blanket on the walkers. When rotational movement is imparted to the crankshafts 22 and 24 by conventional drive means (undisclosed), they in turn impart a rotational translatory movement to each straw walker as a whole so that every portion of each straw walker is continuously driven in a vertical circular path. The rotational translatory movement of the straw walkers moves the grain to the rear of the combine while further separating grain from the straw. Grain separated from the straw by the straw walkers falls through the straw walkers as is conventional. The grain passing through the forward portion of the straw walkers falls onto the forward grain pan 18 and the grain passing through the rear portion of the straw walkers falls onto a rear gain pan 30.

The forward grain pan 18 has a reciprocating motion which moves the grain thereon rearwardly to the forward ends of a grain cleaning unit which includes a conventional chaffer 32 and sieve 34. It should be noted that the cleaning unit illustrated in the drawing is for illustration purposes only and that the cleaning unit may take other forms such as a rotary cleaning unit. Therefore, reference to the forward end of the cleaning unit does not refer to the normal direction of travel of the combine as a whole, but merely to the direction of travel of the grain through the cleaning unit.

The novel conveying means according to the present invention for moving grain passing through the rear portion of the straw walker to the forward portion or material-receiving portion of the cleaning unit includes the grain pan 30 which is secured in a fixed position to the sidewalls 28 and a plurality of sweeps 36 secured to and depending from each of the straw walkers 20. Each of the sweeps 36 is formed as a sheet of flexible material and has its upper end secured to one leg of a right angle bracket 38 which has its other leg secured to the bottom of one of the straw walkers. Each of the sweeps 36 is substantially the same width as its associated straw walker and has a vertical dimension less than the distance between the bottom of the straw walker and the fixed pan 30 when the straw walker is in an upper portion of its path of movement and greater than the distance between the bottom of the straw walker and the fixed pan 30 when the straw walker is in a lower portion of its path of travel.

During operation the crankshafts 22 and 24 are driven in a clockwise direction as viewed in FIG. 1 so that the straw walkers will move upwardly and rearwardly and then downwardly and forwardly. With this movement of the straw walkers, the sweeps 36 are raised and moved rearwardly and then lowered and moved forwardly. During the forward movement of the sweeps 36 they engage any material on the grain pan 30 and move the same forwardly towards the terminal end of the grain pan 30 so that the material will be deposited on the forward portion of the cleaning unit. Since the sweeps have a vertical dimension which is greater than the distance between the bottom of the straw walker and the grain pan during the forward movement of the straw walkers, their lower ends will engage the pan 30 and flex rearwardly as illustrated in FIG. 1. When the straw walkers begin to move upwardly and the sweeps 36 are raised, their lower ends will snap forwardly because of their resilient nature and will impart an additional movement to the grain on the pan. A deflector 40 extends between the sidewalls 28 of the combine forwardly of the fixed grain pan 30 so that any material thrown by the snapping action of the forward sweeps 36 will strike the deflector 40 and fall onto the forward portion of the cleaning unit. If the combine is operating on a hillside, the grain on the pan 30 will have a tendency to move to the low side of the pan 30 and will be delivered to a single side of the cleaning unit rather than having an even distribution over the entire width of the cleaning unit. However, the grain is prevented from moving to the low side of the pan by divider plates 42 which are secured to the pan 30 and extend upwardly between the sweeps secured to each adjacent pair of straw walkers. If desired, the sweeps 36 can be made narrower so that they can be mounted in pairs and additional divider plates mounted between the pairs of sweeps will provide a more even distribution of grain on the cleaning unit.

From the foregoing description it can be seen that the present invention provides a conveyor mechanism beneath the straw walkers of a threshing machine which is extremely simple in design and operation, which requires no movement except the movement of the straw walkers, and which can be economically manufactured. It should also be noted that the conveyor mechanism illustrated in the drawing and described in the foregoing specification requires a minimal amount of space beneath the straw walkers and cleaning unit since the only requirements of the distance between the straw walkers and grain pan is that there be sufficient room to handle the grain and chaff passing through the straw walkers.

Although only a single preferred embodiment of the invention has been illustrated and described, the invention can take other forms which will become obvious to those skilled in the art after reading the foregoing description. Therefore, the invention should not be limited to the specific illustrated and described embodiment, but should be limited only by the following claims.

I claim:

1. In a harvesting implement having a threshing unit, means for feeding crop material to the threshing unit, an elongated straw walker mounted on a pair of spaced crankshafts in crop-receiving relationship to the threshing unit for rotational translatory movement in a vertical circular path, and a cleaning unit mounted beneath the straw walker having front and rear portions, means for moving material passing through the straw walker to the forward portion of the cleaning unit comprising: a grain pan secured in a fixed position beneath the straw walker and having one terminal end positioned above the forward portion of the cleaning unit; a plurality of sweeps secured to and depending from the straw walker along the length thereof for engaging material on the pan and moving the same toward the one terminal end of the pan during a portion of each revolution of the straw walker; each of the sweeps being constructed of a sheet of resilient material, having one end rigidly secured to the straw walker, and extending downwardly from the straw walker; and each of the sweeps having a vertical dimension greater than the distance between the straw walker and pan at the low point in the path of the straw walker and less than the distance between the straw walker and pan at the high point of the path of the straw walker.

2. In a combine including a body having opposite upright sidewalls and a forward crop inlet opening, a threshing unit mounted between the sidewalls adjacent the crop inlet opening for receiving crop moving through the inlet opening, a plurality of elongated straw walkers disposed in side-by-side relationship between the sidewalls and having their forward ends positioned in crop-receiving relationship to the threshing unit, the straw walkers being mounted on front and rear crankshafts journaled in the sidewalls whereby rotation of the crankshafts imparts a rotational translatory movement to the straw walkers, and a cleaning unit disposed between the sidewalls below the straw walkers and having a material-receiving portion, means for delivering material passing through the straw walkers to the material-receiving portion of the cleaning unit comprising: a grain pan secured between the sidewalls and under the straw walkers for receiving material passing through the straw walkers; the grain pan having a terminal end positioned above the material-receiving portion of the cleaning unit; a plurality of sweeps constructed of an elastic material have one end rigidly secured to and depending from each of the straw walkers along the length thereof; each of the sweeps having a vertical dimension when in a relaxed condition which is greater than the distance between its associated straw walker and the grain pan at the low point in the path of travel of its associated straw walker and is less than the distance between its associated straw walker and the grain pan at the high point in the path of travel of its associated straw walker.

3. The combination set forth in claim 2 wherein a dividing wall is secured to the grain pan between each adjacent pair of straw walkers and extends upwardly between the sweeps depending from each adjacent pair of straw walkers.

4. In a combine including a body having opposite upright sidewalls and a forward crop inlet opening, a threshing unit mounted between the sidewalls adjacent the crop inlet opening for receiving crop moving through the inlet opening, a plurality of elongated straw walkers disposed in side-by-side relationship between the sidewalls and having their forward ends positioned in crop-receiving relationship to the threshing unit, the straw walkers being mounted on front and rear crankshafts journaled in the sidewalls whereby rotation of the crankshafts imparts a rotational translatory movement to the straw walkers, and a cleaning unit disposed between the sidewalls below the straw walkers and having a material-receiving portion, means for delivering material passing through the straw walkers to the material-receiving portion of the cleaning unit comprising: a grain pan secured between the sidewalls and under the straw walkers for receiving material passing through the straw walkers; the grain pan having a terminal end positioned above the material-receiving portion of the cleaning unit; a plurality of sweeps secured to and depending from each of the straw walkers along the length thereof; and a dividing wall secured to the grain pan between each adjacent pair of straw walkers and extending upwardly between the sweeps depending from each adjacent pair of straw walkers.

* * * * *